(12) United States Patent
Kim

(10) Patent No.: US 9,356,269 B2
(45) Date of Patent: May 31, 2016

(54) BATTERY PACK

(71) Applicant: Myung-Chul Kim, Yongin-si (KR)

(72) Inventor: Myung-Chul Kim, Yongin-si (KR)

(73) Assignees: SAMSUNG SDI CO., LTD., Yongin-si, Gyeonggi-do (KR); ROBERT BOSCH GmbH, Stuttgart (DE)

(*) Notice: Subject to any disclaimer, the term of this patent is extended or adjusted under 35 U.S.C. 154(b) by 663 days.

(21) Appl. No.: 13/645,792

(22) Filed: Oct. 5, 2012

(65) Prior Publication Data

US 2013/0266833 A1      Oct. 10, 2013

(30) Foreign Application Priority Data

Apr. 9, 2012 (KR) .................. 10-2012-0036760

(51) Int. Cl.
*H01M 10/50* (2006.01)
*H01M 10/48* (2006.01)
*H01M 2/04* (2006.01)
*H01M 2/12* (2006.01)
*H01M 2/10* (2006.01)
*H01M 6/50* (2006.01)
*H01M 2/34* (2006.01)
*H01M 10/637* (2014.01)
*H01M 10/6557* (2014.01)
*H01M 10/6561* (2014.01)
*H01M 10/613* (2014.01)

(52) U.S. Cl.
CPC .......... *H01M 2/1077* (2013.01); *H01M 10/486* (2013.01); *H01M 2/1252* (2013.01); *H01M 2/348* (2013.01); *H01M 6/50* (2013.01); *H01M 6/5011* (2013.01); *H01M 6/5044* (2013.01); *H01M 10/482* (2013.01); *H01M 10/613* (2015.04); *H01M 10/637* (2015.04); *H01M 10/6557* (2015.04); *H01M 10/6561* (2015.04); *H01M 2200/10* (2013.01)

(58) Field of Classification Search
None
See application file for complete search history.

(56) References Cited

U.S. PATENT DOCUMENTS

| | | | |
|---|---|---|---|
| 2002/0044742 A1* | 4/2002 | Yoneda | 385/37 |
| 2006/0028183 A1* | 2/2006 | Izawa et al. | 320/150 |
| 2009/0011326 A1* | 1/2009 | Wood et al. | 429/99 |
| 2010/0215999 A1* | 8/2010 | Yoon | 429/90 |
| 2011/0104533 A1* | 5/2011 | Seto | 429/90 |

FOREIGN PATENT DOCUMENTS

| | | |
|---|---|---|
| JP | 2011-096507 A | 5/2011 |
| KR | 10-1998-0006601 A | 3/1998 |
| KR | 20-0335454 Y1 | 12/2003 |
| KR | 10-2004-0045937 A | 6/2004 |
| KR | 10-0928563 B1 | 11/2009 |

OTHER PUBLICATIONS

Korean Office Action dated Dec. 21, 2015 in Corresponding Korean Patent Application No. 10-2012-0036760.

* cited by examiner

*Primary Examiner* — Ula C Ruddock
*Assistant Examiner* — Matthew Van Oudenaren
(74) *Attorney, Agent, or Firm* — Lee & Morse, P.C.

(57) ABSTRACT

A battery pack includes a plurality of battery cells arranged along one direction, a top cover covering the plurality of battery cells and the top cover includes an opening in at least one portion thereof, and a temperature measuring member including a main body portion mounted in the opening and a wire portion accommodating a wire connected to a sensor. The sensor is built into the main body portion and measures a temperature of at least one of the battery cells.

19 Claims, 5 Drawing Sheets

BATTERY PACK

CROSS-REFERENCE TO RELATED APPLICATION

This application claims priority under 35 U.S.C. §119 to Korean Patent Application No. 10-2012-0036760, filed on Apr. 9, 2012, in the Korean Intellectual Property Office, and entitled: "Battery Pack," which is incorporated by reference herein in its entirety.

BACKGROUND

A high-power battery pack using a non-aqueous electrolyte with high energy density has been undergoing development. The high-power battery pack is configured as a large-capacity battery pack manufactured by connecting a plurality of battery cells in series, e.g., so as to be used in driving motors of devices requiring high power such as electric vehicles and the like.

SUMMARY

Embodiments may be realized by providing a battery pack that includes a plurality of battery cells arranged along one direction, a top cover covering the plurality of battery cells, the top cover including an opening in at least one portion thereof, and a temperature measuring member including a main body portion mounted in the opening and a wire portion accommodating a wire connected to a sensor, which sensor is built into the main body portion and measures a temperature of at least one of the battery cells.

The battery pack may include a controller connected to the temperature measuring member. The controller may collect or control temperature information of the battery cells. One section of the wire is in the main body portion and the wire portion, and another section of the wire protrudes to an outside of the wire portion, the other second of the wire being connected to the controller. The temperature measuring member may be electrically connected to the controller through the wire.

The main body portion and the wire portion may be made of a material containing at least one of thermal conductive plastic, rubber, and silicon with elasticity. The sensor may be mounted on a bottom portion of the main body portion.

The temperature measuring member may include a metal member on a bottom portion of the main body portion, and the metal member may face the at least one of the plurality of battery cells. The sensor may be mounted to be in contact with the metal member. The sensor may be mounted to be on a top surface of the metal member. The sensor may be embedded in the metal member.

The top cover may include a groove and the opening may be formed in a bottom portion of the groove. The battery pack may include a thermal conducting member between a bottom surface of the main body portion and the at least one of the battery cells.

The sensor may be embedded in a lower part of the main body portion, and the lower part of the main body portion may be between the opening in the top cover and the at least one of the battery cells. Each of the plurality of battery cells may include a vent that is connected to a vent cover, and the vent cover may overlap the plurality of battery cells. The temperature measuring member may be adjacent to the vent cover.

The top cover may include a groove. The main body portion, the wire portion, and the wire extending through the main body portion and the wire portion are each arranged in the groove. The opening in the top cover may be formed in a bottom portion of the groove. The main body portion may extend through the opening, and the wire portion and the wire may be seated on the bottom portion of the groove.

A lower part of the main body portion may be above the at least one of the plurality of battery cells and may be below the opening in the top cover. The lower part may include the sensor embedded therein. An upper part of the main body portion may be above the bottom portion of the groove and a section of the wire may be embedded in the upper part.

The battery pack may include a metal member embedded in the main body portion, and the metal member may be directly on a bottom surface of the main body portion and may be in direct contact with the sensor in the main body portion. At least a part of a bottom surface of the metal member may be exposed through the bottom surface of the main body portion and may face the at least one of the battery cells. A part of the sensor may be exposed through a bottom surface of the main body portion and faces the at least one of the battery cells.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
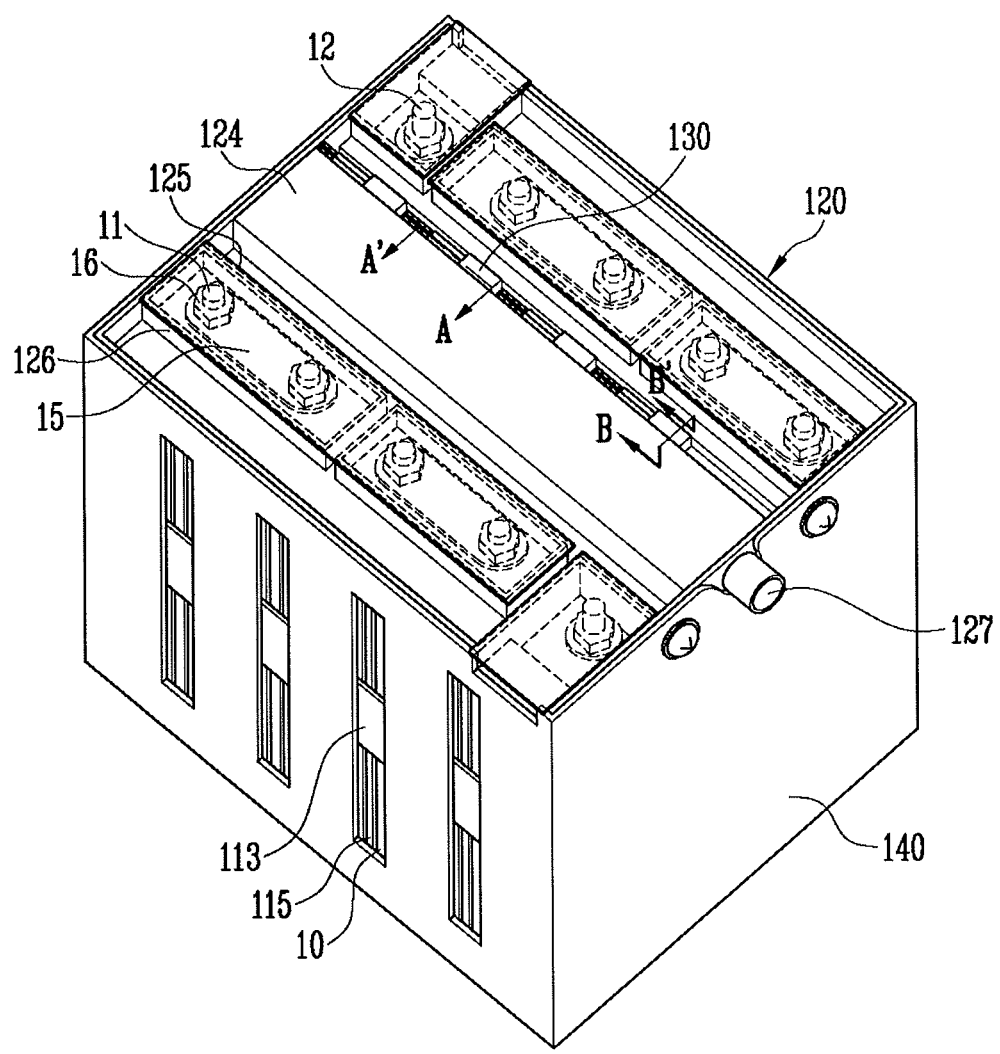
FIG. 1 illustrates a perspective view of a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Accordingly, the drawings and description are to be regarded as illustrative in nature and not restrictive. Like reference numerals refer to like elements throughout.

It will also be understood that when an element is referred to as being "on" another element, it can be directly on the other elements, or intervening elements may also be present. Further, it will be understood that when an element is referred to as being "under" another element, it can be directly under, and one or more intervening elements may also be present. It will also be understood that when an element is referred to as being "between" two elements, it can be the only element between the two elements, or one or more intervening elements may also be present. Also, when an element is referred to as being "connected to" another element, it can be directly connected to the other element or be indirectly connected to the other element with one or more intervening elements interposed therebetween.

Hereinafter, a battery pack according to an exemplary embodiment will be described with reference to FIGS. 1 to 4.

Figure 2:
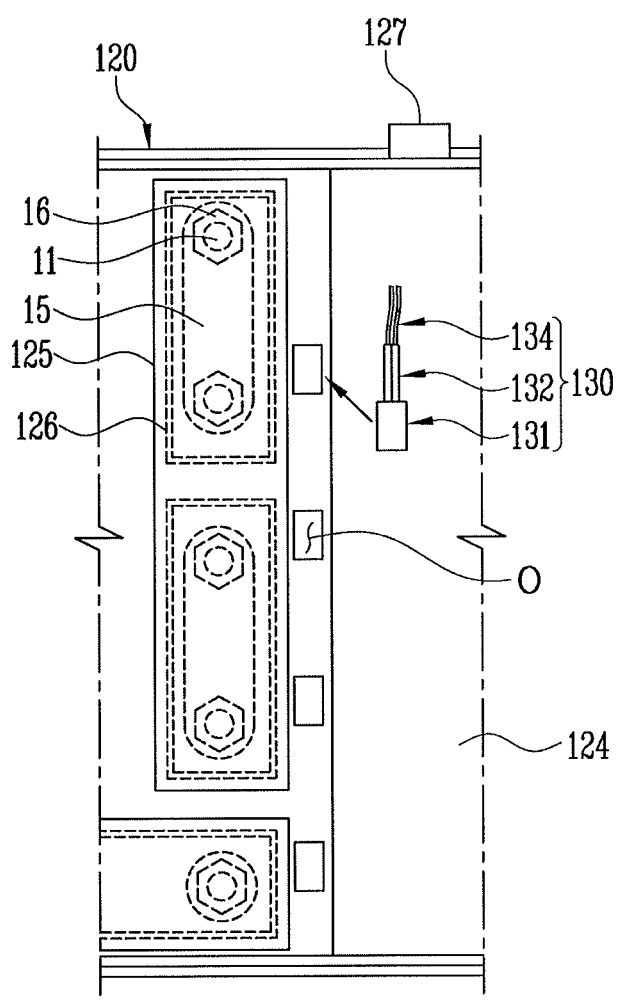
FIG. 2 illustrates a partially enlarged view of a top cover of the battery pack in FIG. 1.
Figure 3:
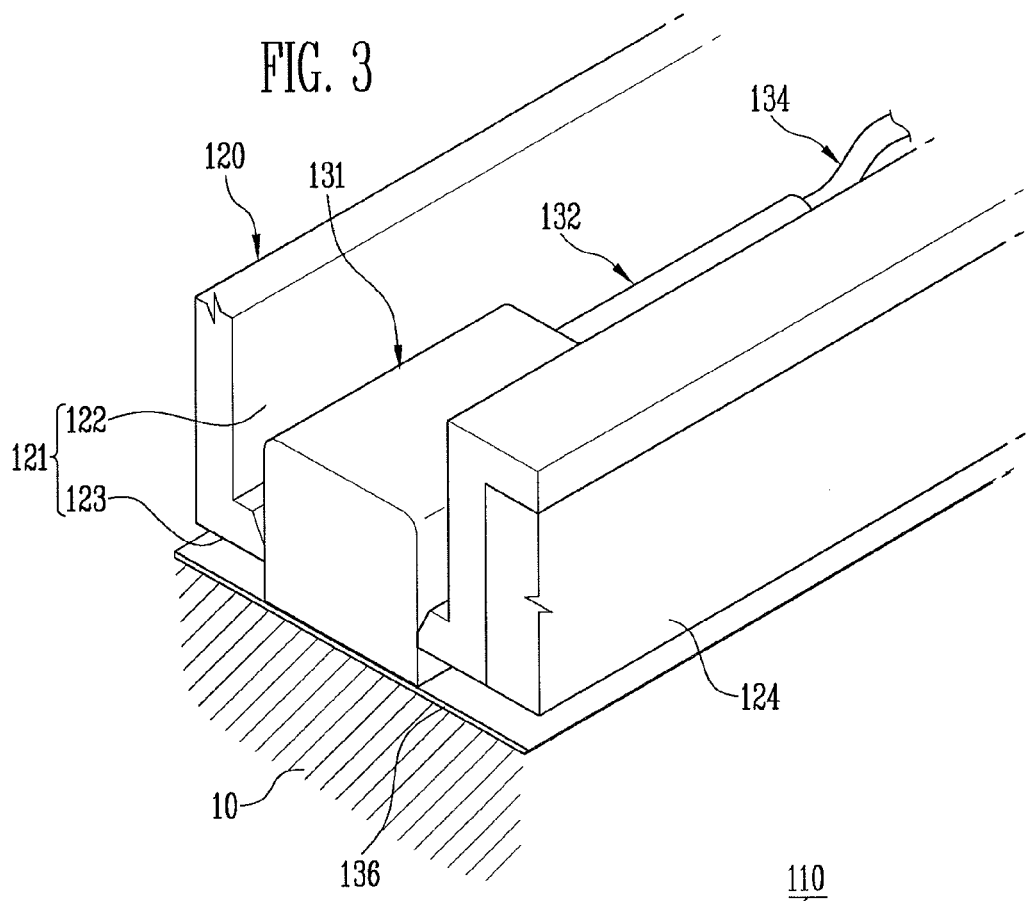
FIG. 3 illustrates a perspective view taken along line B-B' of FIG. 1 according to an exemplary embodiment.
Figure 4:
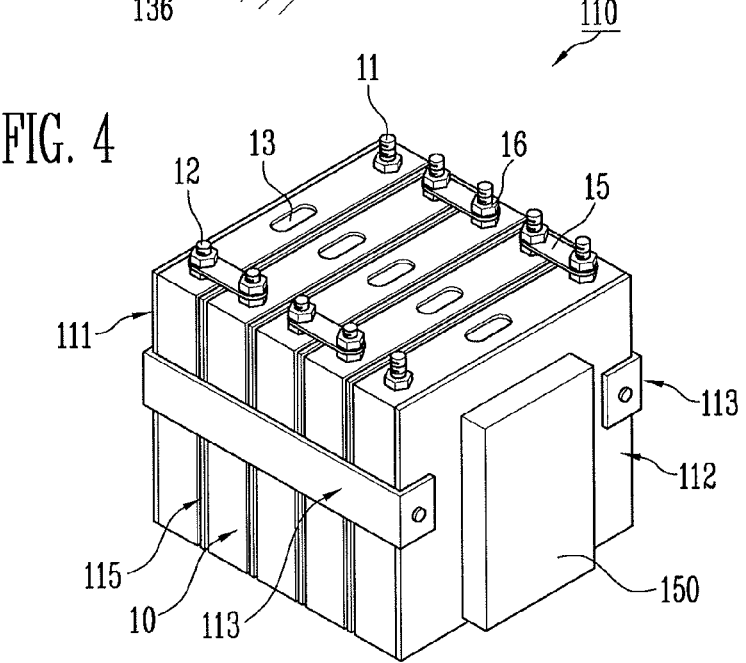
FIG. 4 illustrates a perspective view showing a battery module included in the battery pack according to an exemplary embodiment.

FIG. 1 is a perspective view of a battery pack according to an exemplary embodiment. FIG. 2 is a partially enlarged view of a top cover of FIG. 1. FIG. 3 is a perspective view taken along line B-B' of FIG. 1 according to the exemplary embodiment. FIG. 4 is a perspective view showing a battery module included in the battery pack according to the exemplary embodiment.

Referring to FIGS. 1 to 3, the battery pack 100 may include a plurality of battery cells 10 arranged in one direction, e.g., arranged in parallel along a first direction. A top cover 120 may cover the plurality of battery cells 10, e.g., by extending across each of the plurality of battery cells 10 along the first direction. The top cover 120 may have an opening O formed in at least one portion thereof, e.g., the top cover 120 may have a plurality of openings O that each overlaps at least one of the plurality of battery cells 10.

The top cover 120 and a lower case 140 may be fastened to each other so as to accommodate the plurality of battery cells 10, e.g., as illustrated in FIG. 1. Each of the battery cells 10 may be housed within, e.g., completely within, the lower case 140 and the top cover 120 may cover top surfaces of the battery cells 10.

Figure 6A:
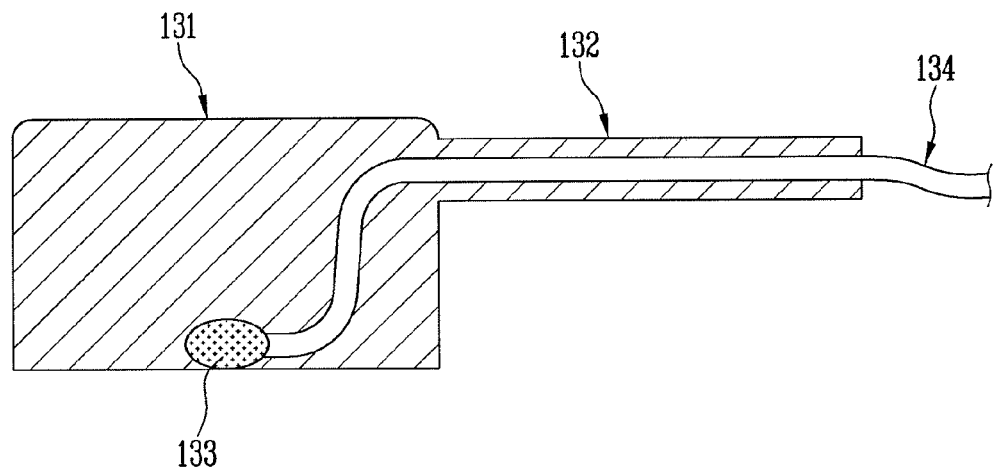
FIG. 6A illustrates a sectional view taken along line A-A' of FIG. 1 according to an exemplary embodiment.
Figure 6B:
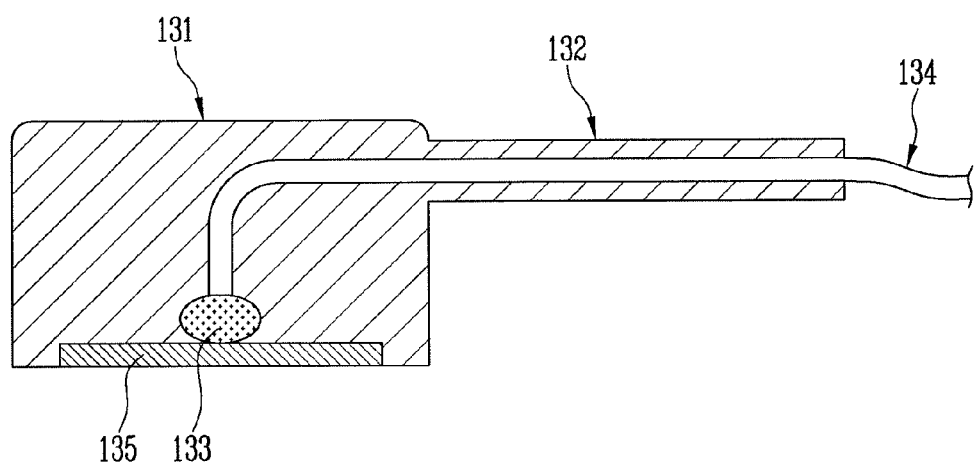
FIG. 6B illustrates a sectional view taken along line A-A' of FIG. 1 according to an exemplary embodiment.
Figure 6C:
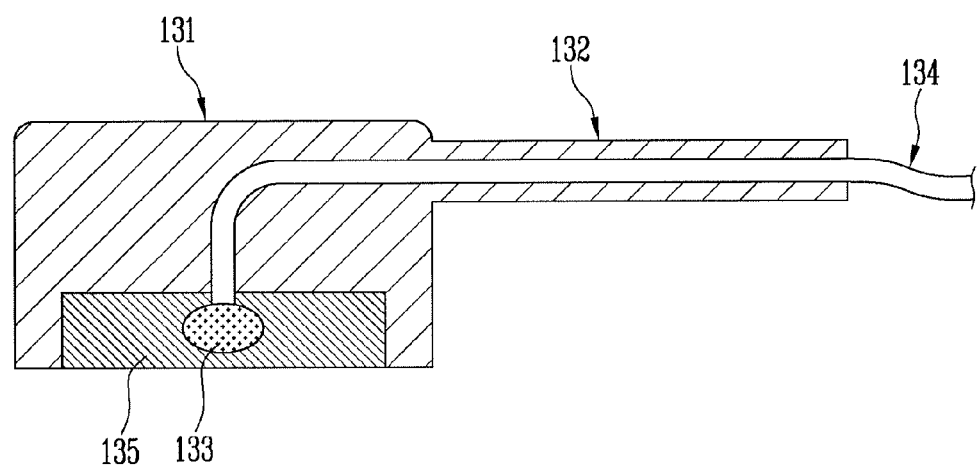
FIG. 6C illustrates a sectional view taken along line A-A' of FIG. 1 according to an exemplary embodiment.

A temperature measuring member 130 may be mounted in one opening O. The temperature measuring member 130 may have a main body portion 131 disposed within, e.g., mounted in, the opening O. A sensor 133, e.g., as illustrated in FIGS. 6A-6C, may be arranged and/or built in the main body portion 131. The sensor 133 may measure a temperature of at least one of the battery cells 10. For example, the sensor 133 may measure the temperature of corresponding ones of the battery cells 10 that are arranged thereunder. For example, a plurality of temperature measuring members 130 may be formed and each one of the plurality of temperature measuring members 130 corresponds to one or more of the battery cells 10.

A wire portion 132, which accommodates a wire 134, may be connected to the main body portion 131. The wire 134 may be connected, e.g., directly connected in an electrical manner, to the sensor 133. The wire 134 may extend from the main body portion 131 and through the wire portion 132 so as to be exposed.

The opening O having the temperature measuring member 130 mounted therein may be formed in an area of the top cover 120. For example, the area of the top cover 120, in which the opening O is formed, may correspond to, e.g., overlap, an area between a vent portion 13 and electrode terminal 11 or 12 of at least one of the battery cells 10.

According to an exemplary embodiment in which a cooling method applied to the battery pack 100 includes an air-cooling method using air as a refrigerant, the temperature of the top cover 120 that is the top surface of the battery pack 100 may be the highest. Therefore, the largest amount of heat may be generated in the area between the vent portion 13 and the electrode terminal 11 or 12. Accordingly, the temperature measuring member 130 may be mounted, e.g., preferably mounted, in the area of the top cover 120 that overlaps the area between the vent portion 13 and the electrode terminal 11 or 12, so as to manage the maximum temperature of the battery cell 10 thereunder.

For example, the temperature measuring member 130 may be mounted in the area of the top cover 120, corresponding to the area between the vent portion 13 and the negative electrode terminal, e.g., in which a larger amount of heat may be generated rather than the positive electrode terminal, of the electrode terminals 11 and 12 of one of the battery cells 10, so as to manage the maximum temperature of the battery cell 10.

The opening O of the top cover 120 may be formed in a groove portion 121, e.g., as illustrated in FIG. 3. The groove portion 121 may have an inside portion 122, e.g., a portion defining sidewalls of the groove portion 121, and a bottom portion 123, e.g., that faces the battery cell 10. The opening O may be formed to have a shape corresponding to the main body portion 131 of the temperature measuring member 130, e.g., the main body portion 131 may be seated within the opening O. The wire portion 132 may not be seated in the opening O and instead may be seated on the bottom portion 123 of the groove portion 121. The opening O may extend through the bottom portion 123 of the groove portion 121 so as to expose the battery cell 10. Accordingly, the main body portion 131 may be mounted to pass through the opening O, e.g., so that a lower portion of the main body portion 131 is below the bottom portion 123. Thus, a bottom surface of the main body portion 131 may be below the top cover 120. An upper portion of the main body portion 131 may be housed within, e.g., completely within, the groove portion 121 so that sides of an upper portion of the main body portion 131 face the inside portion 122.

The sensor 133 may be mounted on the main body portion 131, e.g., the sensor 133 may be mounted within at least a part of the lower portion of the main body portion 131, which will be described later (see, e.g., FIG. 6A). The sensor 133 may be disposed close to the battery cell 10. Accordingly, the sensor 133 may sense, e.g., exactly sense, heat from the battery cell 10. For example, the sensor 133 may sense the maximum temperature within the battery cell 10.

A thermal conducting member 136 may be interposed between a bottom surface of the main body portion 121 and an upper surface of the battery cell 10 so that the heat from the battery cell 10 may be more easily conducted to the temperature measuring member 130. The thermal conducting member 136 may be on, e.g., directly on, the bottom surface of the main body portion 131. The thermal conducting member 136 may be extend over the plurality of battery cells 10 so as to be between the bottom portion 123 of the groove portion 121 of the top cover 120 and the plurality of battery cells 10.

Referring to FIGS. 2 and 4, the vent portion 13 of the battery cell 10 may be provided between the positive and negative electrode terminals 11 and 12 of each of the battery cells 10 so as to serve as a path along which gas is exhausted. A vent cover 124 may be provided at a region of the top cover 120 that corresponds to, e.g., overlaps, the vent portions 13 of each of the battery cells 10. The vent cover 124 may have the shape of a hexahedron having an inside opened in one direction. For example, the vent cover 124 may have a shape that serves as a conduit for the discharge of gas therethrough. The vent cover 124 may be mounted on the battery cells 10 so that the opened surface faces the vent portions 13. A gas exhaustion port 127 may be provided at one end of the vent cover 127. Accordingly, a gas flow path may be formed between the vent portions 13 of the battery cells 10 and the gas exhaustion port 127 by the vent cover 124 coming into close contact with the battery cells 10. The temperature measuring member 130 may be adjacent to the vent cover 124, e.g., each of a plurality of temperature measuring members 130 may be arranged along the vent cover 124 in the first direction.

The electrode terminals 11 and 12 of two adjacent battery cells 10, e.g., adjacent along the first direction, may be electrically connected through a bus-bar 15. Holes through which the positive and negative electrode terminals 11 and 12 pass, respectively, may be provided in the bus-bar 15. The bus-bar 15 through which the terminals 11 and 12 are connected to each other may be fixed by a member such as a nut 16. A bus-bar cover 125 may cover, e.g., overlap, the bus-bar 15. For example, the bus-bar cover 125 may extend in the first direction to overlap multiple bus-bars 15 along the first direction.

A partition wall 126, e.g., that may be formed on the top cover 120, may surround the bus-bar 15, e.g., so as to support the bus-bar 15. The partition wall 126 may be part of the top cover 120, e.g., may be mounted on the top cover 120 or may be integrally formed with the top cover 120. The partition wall 126 may be under only one bus-bar 15 and another partition wall 126 may be under an adjacent bus-bar 15.

The battery module 110 may include the plurality of battery cells 10 and a pair of first and second end plates 111 and 112 provided to be spaced apart from each other with the plurality of battery cells 10 therebetween. Connecting members 113 may connect the first and second end plates 111 and 112 to each other.

The first and second end plates 111 and 112 may be disposed to come into surface contact with the outermost battery cells 10, respectively. Thus, the first and second end plates 111 and 112 may press the plurality of battery cells 10 in the inside direction of the plurality of battery cells 10. The connecting members 113 may be connected to the first and second end plates 111 and 112. One end of the connecting member 113 may be fastened to the first end plate 111, and the other end of the connecting member 113 may be fastened to the second end plate 112. The first and second end plates 111 and 112 and the connecting members 113 may be fastened by a member such as a bolt or nut.

A barrier 115 may be interposed between the battery cells 10. A spacer (not shown) may be provided to the barrier 115 so as to space apart the adjacent battery cells 10 from each other and to form a space between the battery cells 10. Thus, it is possible to provide a moving path of air that is a refrigerant for cooling the battery cells 10.

A controller 150 collecting and/or controlling temperature information of the battery cell 10 from the temperature measuring member 130 may be provided on the first or second end plate 111 or 112. Although it has been illustrated in this embodiment that the controller 150 is provided on the second end plate 112, the position of the controller 150 is not limited thereto. For example, the controller 150 may be provided on the first end plate 111 or may be provided at any position adjacent to the battery module 110. The temperature measuring member 130 may be electrically connected to the controller 150 through the wire 134.

According to an exemplary embodiment, one portion of the wire 134 is built in the main body portion 131 and the wire portion 132, and the other portion of the wire 134 is protruded to the outside of the wire portion 132 so as to be connected to the controller 150. For example, the wire 134 may extend along the groove portion 121 of the top cover 120 so as to be connected to the controller 150. Each of the plurality of battery cells 10 may have one temperature measuring member 130 connected thereto so that a plurality of main body portions 131 may be seated within the groove portion 121 and a plurality of wires 134 may extend along the groove portion 121 to be connected to the controller 150.

The controller 150 may be a battery cell supervision circuit or battery management system (BMS). The temperature of the battery cell 10, as measured by the main body portion 131 of the temperature measuring member 130, may be data for controlling the temperature of the battery pack 100 through the process in which the temperature of the battery cell 10 is collected and sent to the controller 150 through the wire 134 connected to the main body portion 131.

Hereinafter, the temperature measuring member 130, according to exemplary embodiments, will be described with reference to FIGS. 5 to 6C.

Figure 5:
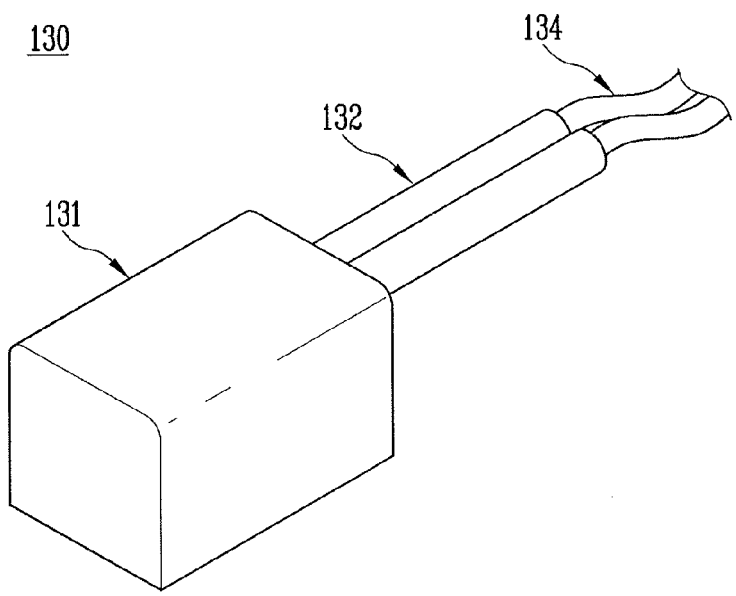
FIG. 5 illustrates an enlarged perspective view of a temperature measuring member of FIG. 1.

FIG. 5 is an enlarged perspective view of a temperature measuring member of FIG. 1. FIG. 6A is a sectional view of the temperature measuring member taken along line A-A' of FIG. 1, according to a first exemplary embodiment. FIG. 6B is a sectional view of the temperature measuring member taken along line A-A' of FIG. 1, according to a second exemplary embodiment. FIG. 6C is a sectional view of the temperature measuring member taken along line A-A' of FIG. 1, according to a third exemplary embodiment.

Referring to FIGS. 5 and 6A, the temperature measuring member 130 may be configured to have the main body portion 131 in which the sensor 133 measuring a temperature of the battery cell 10 is built therein and the wire portion 132 accommodating the wire 134 connected to the sensor 133. The main body portion 131 and the wire portion 132 may be made of a material containing thermal conductive plastic, rubber, and/or silicon with elasticity so as to manage the temperature of the battery cell 10. The wire portion 132 may be integrally formed with the main body portion 131, and the wire portion 132 may extend from the upper portion of the main body 131 so that the wire portion 132 is supported within the groove portion 121 of the top cover 120.

The wire 134 may be surrounded with insulative coating so as to reduce the possibility of and/or prevent the fracture thereof. The wire 134 may be composed of two strands of wires, i.e., positive (+) and negative (−) wires. The sensor 133 may be formed by surrounding one portion of the wire 134, e.g., the end of the wire 134 housed within the main body portion 131, and a connecting portion of a small-sized circuit chip with thermal conductive coating. As such, the sensor 133 may be surrounded with the thermal conductive coating and disposed to approach the battery cell 10 as close as possible or come in direct contact with the battery cell 10. Thus, the sensor 133 may sense, e.g., exactly sense, heat from the battery cell 10.

The heat from the battery cell 10 may be converted into an electrical signal in the sensor 133 having the circuit chip built therein. The converted electrical signal may be collected and controlled by the controller 150 through the wire 134 data. Thus, the electrical signal may be data for controlling the temperature of the battery pack 100.

Referring to FIG. 6A, the sensor 133 of the temperature measuring member 130, according to the first exemplary embodiment, is mounted on the bottom surface of the main body portion 131, e.g., within the lower portion of the main body portion 131 that is below the bottom portion 123 of the groove portion 121 (of the top cover 120) so as to approach the battery cell 10 as close as possible. The main body portion 131 may be formed so that a portion of the sensor 133 is exposed from the bottom surface of the main body portion 131. For example, the bottom surface of the main body portion 131 may include an opening corresponding to the placement of the sensor 133. Thus, the sensor 133 may come into direct contact with the underlying battery cell 10. In the temperature measuring member 130 according to the first embodiment, the sensor 133 preferably approaches the battery cell 10 as close as possible or comes into direct contact with the battery cell 10 so as to sense, e.g., exactly sense, the heat from the battery cell 10.

Referring to FIG. 6B, the temperature measuring member 130, according to the second exemplary embodiment, further includes a metal member 135 disposed on the bottom surface of the main body portion 131. The metal member 135 may be disposed so that a portion of the metal member 135 is exposed from the bottom surface of the main body portion 131 so as to face the battery cell 10. For example, the main body portion 131 may have an opening corresponding to the placement of the metal member 135. The sensor 133 may be mounted on a top surface of the metal member 135 so as to come into contact with the metal member 135. Accordingly, the sensor 133 of the temperature measuring member 130 according to the second embodiment comes in contact with the battery cell 10 by the medium of the metal member 135 having excellent conductivity, so as to exactly sense the heat from the battery cell 10.

Referring to FIG. 6C, similar to the second exemplary embodiment, the temperature measuring member 130 according to the third exemplary embodiment further includes a metal member 135 disposed on the bottom portion of the main body portion 131. The metal member 135 may be disposed so that a portion of the metal member 135 is exposed from the bottom surface of the main body portion 131 so as to face the battery cell 10. The sensor 133 may be built in, e.g., completely within, the metal member 135 so as to come in contact with the metal member 135. Accordingly, since the sensor 133 of the temperature measuring member 130 according to the third embodiment is surrounded by the metal member 135 having excellent conductivity, the sensor 133 comes in contact with the battery cell 10 by the medium of the metal member 135, so as to sense, e.g., exactly sense, the heat from the battery cell 10.

As described above, according to embodiments, it may be possible to provide a top cover to which a temperature measuring member capable of exactly measuring heat generated a battery cell is mounted and a battery pack having the same. Further, it may be possible to provide a battery pack capable of simplifying an assembling process by integrating a temperature measuring member to a top cover. Accordingly, the temperature measuring member may not be separated from the top cover, but adhered closely to the battery cell by applying the structure of a latching projection to the temperature measuring member. Thus, it is possible to improve the measuring accuracy of the temperature measuring member.

Although it has been described in the embodiment that the battery cell is a prismatic lithium-ion secondary battery, embodiments are not limited thereto. For example, the battery cell may be applied to batteries of various shapes, including a lithium polymer battery, a cylindrical battery, and the like.

By way of summation and review, a battery cell includes an electrolyte and an electrode assembly composed of a positive plate and a negative electrode plate, and generates energy through an electrochemical reaction of these electrode plates and the electrolyte. In this case, gas and heat may be generated in the inside of the battery cell through a side reaction of the electrochemical reaction. As such, a plurality of battery cells may be deteriorated by the heat generated in the battery cells and a lifetime of the battery cells may be reduced.

In contrast, embodiments relate to a battery pack having a temperature measuring member mounted thereto. The temperature measuring member may be capable of exactly measuring heat generated in a battery cell. Further, an assembly process may be simplified by integrating a temperature measuring member into a top cover of the battery pack.

As described above, according to embodiments, it may be possible to provide a battery pack to which a temperature measuring member, which is capable of exactly measuring heat generated in a battery cell, is mounted. Further, it may be possible to provide a battery pack capable of simplifying an assembly process by integrating a temperature measuring member into a top cover of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged along one direction;
a top cover covering the plurality of battery cells, the top cover including an opening in at least one portion thereof;
a temperature measuring member including a main body portion mounted in the opening and a wire portion accommodating a wire connected to a sensor, the sensor being built into the main body portion and measuring a temperature of at least one of the battery cells, a lowest surface of the main body portion being above a top surface of the at least one of the plurality of battery cells, the top surface of the at least one of the plurality of battery cells being closest to the top cover; and
a metal member embedded in the main body portion, the metal member being directly on a bottom surface of the main body portion and being in direct contact with the sensor in the main body portion.

2. The battery pack as claimed in claim 1, further comprising a controller connected to the temperature measuring member, the controller collecting or controlling temperature information the battery cells.

3. The battery pack as claimed in claim 2, wherein one section of the wire is in the main body portion and the wire portion, and another section of the wire protrudes to an outside of the wire portion, the another section of the wire being connected to the controller.

4. The battery pack as claimed in claim 2, wherein the temperature measuring member is electrically connected to the controller through the wire.

5. The battery pack as claimed in claim 1, wherein the main body portion and the wire portion are made of a material containing at least one of thermal conductive plastic, rubber, and silicon with elasticity.

6. The battery pack as claimed in claim 1, wherein the sensor is mounted on a bottom portion of the main body portion.

7. The battery pack as claimed in claim 1, wherein the temperature measuring member includes a metal member on a bottom portion of the main body portion, the metal member facing the at least one of the plurality of battery cells.

8. The battery pack as claimed in claim 7, wherein the sensor is mounted to be in contact with the metal member.

9. The battery pack as claimed in claim 8, wherein the sensor is mounted to be on a top surface of the metal member.

10. The battery pack as claimed in claim 8, wherein the sensor is embedded in the metal member.

11. The battery pack as claimed in claim 1, wherein the top cover includes a groove and the opening is formed in a bottom portion of the groove.

12. The battery pack as claimed in claim 1, further comprising a thermal conducting member between a bottom surface of the main body portion and the top surface of the at least one of the battery cells.

13. The battery pack as claimed in claim 1, wherein the sensor is embedded in a lower part of the main body portion, the lower part of the main body portion being between the opening in the top cover and the at least one of the battery cells.

14. The battery pack as claimed in claim 1, wherein each of the plurality of battery cells includes a vent that is connected to a vent cover, the vent cover overlapping the plurality of battery cells, and the temperature measuring member being adjacent to the vent cover.

15. The battery pack as claimed in claim 1, wherein the top cover includes a groove, and the main body portion, the wire portion, and the wire extending through the main body portion and the wire portion are each arranged in the groove.

16. The battery pack as claimed in claim 15, wherein the opening in the top cover is formed in a bottom portion of the groove, the main body portion extending through the opening, and the wire portion and the wire being seated on the bottom portion of the groove.

17. The battery pack as claimed in claim 16, wherein:
a lower part of the main body portion includes the lowest surface of the main body portion and is below the opening in the top cover, the lower part including the sensor embedded therein, and
an upper part of the main body portion is above the bottom portion of the groove, a section of the wire being embedded in the upper part.

18. The battery pack as claimed in claim 1, wherein at least a part of a bottom surface of the metal member is exposed through the bottom surface of the main body portion and faces the at least one of the battery cells.

19. The battery pack as claimed in claim 1, wherein a part of the sensor is exposed through a bottom surface of the main body portion and faces the at least one of the battery cells.

* * * * *